United States Patent

Tanaka et al.

[19]

[11] Patent Number: 5,828,902
[45] Date of Patent: Oct. 27, 1998

[54] DISC CONTROL DEVICE HAVING REDUCED SEEK TIME BY SCHEDULING DISC READ REQUESTS

[75] Inventors: Tsutomu Tanaka, Nishinomiya; Yukiko Ito, Moriguchi; Hideaki Yamashita, Kyoto, all of Japan

[73] Assignee: Matsushita Electric Ind., Osaka-fu, Japan

[21] Appl. No.: 488,868

[22] Filed: Jun. 9, 1995

[30] Foreign Application Priority Data

Jun. 10, 1994 [JP] Japan .................................. 6-128946

[51] Int. Cl.$^6$ .............................. G06F 1/04; G06F 3/00
[52] U.S. Cl. ...................... 395/859; 395/552; 395/557; 395/825; 395/860
[58] Field of Search ...................... 395/825, 328, 395/329, 292, 404, 485, 859, 860, 552, 557, 509

[56] References Cited

U.S. PATENT DOCUMENTS

| | | | |
|---|---|---|---|
| 4,638,424 | 1/1987 | Beglin et al. | 364/200 |
| 4,998,030 | 3/1991 | Cates | 307/518 |
| 5,453,779 | 9/1995 | Dan et al. | 348/7 |
| 5,461,415 | 10/1995 | Wolf et al. | 348/7 |
| 5,495,339 | 2/1996 | Stegbauer et al. | 358/296 |
| 5,541,919 | 7/1996 | Yong et al. | 370/61 |
| 5,561,456 | 10/1996 | Yu | 348/7 |
| 5,561,825 | 10/1996 | Yamagami et al. | 395/878 |

OTHER PUBLICATIONS

"I/O Issues in a Multimedia System" by A.L. Narasimha Reddy et al., Computer, vol. 27, No. 3, pp. 69–74, IEEE, Mar. 1994.

*Primary Examiner*—Thomas C. Lee
*Assistant Examiner*—Rehana Perveen
*Attorney, Agent, or Firm*—Price, Gess & Ubell

[57] ABSTRACT

A disc control device for holding a plurality of read requests as a queue, arranging the read requests and a newly inputted read request, reading out the read requests from the queue in the arranged order, and controlling the output of the requested data from a disc, comprises a queue unit for temporarily holds the read requests as the queue in which the read requests can be arranged, the read requests requesting data readout from the disc; an allowable time hold unit holds allowable time, which shows how much more delay can be allowed in order to satisfy delay time until the end of the data output, of each read request in the queue, the delay time being decided based on the ranking in the read request in the queue; and an arrangement control unit arranges the read requests in the queue along with the newly inputted read request in the queue based on the allowable time of each read request in the queue, each time a new read request is inputted.

42 Claims, 12 Drawing Sheets

Fig. 5A

| read request R(x) | order | read request output time t(x) | cylinder position A(x) | seek time S(x) |
|---|---|---|---|---|
| R(1) | 1 | t(1) | A(1) | S(1) |
| R(2) | 2 | t(2) | A(2) | S(2) |
| R(3) | 3 | t(3) | A(3) | S(3) |
| ⋮ | ⋮ | ⋮ | ⋮ | ⋮ |
| R(n) | n | t(n) | A(n) | S(n) |

Fig. 5B

| read request R(x) | allowable delay data P(x) | prohibition flag flg(x) |
|---|---|---|
| R(1) | P(1) | OFF |
| R(2) | P(2) | OFF |
| R(3) | P(3) | ON |
| ⋮ | ⋮ | ⋮ |
| R(n) | P(n) | OFF |

Fig. 8A queue table

| read request R(x) | order N(x) | read request output time t(x) | cylinder position A(x) | seek time S(x) |
|---|---|---|---|---|
| R(1) | 1 | 35 | 1500 | 10 |
| R(2) | 2 | 35 | 2000 | 5 |
| R(3) | 3 | 35 | 1500 | 5 |
| R(4) | 4 | 35 | 1000 | 5 |
| R(5) | 5 | 35 | 500 | 5 | allowable delay data table

| allowable delay data P(x) | prohibition flag flg(x) |
|---|---|
| 50 | OFF |
| 15 | ON |
| 150 | OFF |
| 135 | OFF |
| 95 | OFF |

Fig. 8B queue table

| read request R(x) | order N(x) | read request output time t(x) | cylinder position A(x) | seek time S(x) |
|---|---|---|---|---|
| R(1) | 1 | 35 | 1500 | 10 |
| R(2) | 2 | 35 | 2000 | 5 |
| R(3) | 3 | 35 | 1500 | 5 |
| R(4) | 4 | 35 | 1000 | 5 |
| R(5) | 5 | 35 | 500 | 5 |
| R(6) | 6 | 35 | 300 | 2 | allowable delay data table

| allowable delay data P(x) | prohibition flag flg(x) |
|---|---|
| 50 | OFF |
| 15 | ON |
| 150 | OFF |
| 135 | OFF |
| 95 | OFF |
| 58 | OFF |

Fig. 8C queue table

| read request R(x) | order N(x) | read request output time t(x) | cylinder position A(x) | seek time S(x) |
|---|---|---|---|---|
| R(1) | 1 | 35 | 1500 | 10 |
| R(2) | 2 | 35 | 2000 | 5 |
| R(3) | 3 | 35 | 1500 | 5 |
| R(7) | 4 | 35 | 1300 | 2 |
| R(4) | 5 | 35 | 1000 | 5 |
| R(5) | 6 | 35 | 500 | 5 |
| R(6) | 7 | 35 | 300 | 2 | allowable delay data table

| allowable delay data P(x) | prohibition flag flg(x) |
|---|---|
| 50 | OFF |
| 15 | ON |
| 150 | OFF |
| 138 | OFF |
| 98 | OFF |
| 58 | OFF |
| 21 | OFF | ized. Users can enjoy movies they
DISC CONTROL DEVICE HAVING REDUCED SEEK TIME BY SCHEDULING DISC READ REQUESTS

BACKGROUND OF THE INVENTION (1) Field of the Invention

The present invention relates to a disc control device whose readout throughput is improved by reduction of seek time for all the read requests which are generated randomly. More specifically, this invention relates to the disc control device applied for a video server, in which real-time processing of the read requests generated at a given speed rate is needed.

(2) Description of the Related Art

Recently, a video server which is equipped with a disc control device which stores multi-media data including the video data and the sound data, and which supplies data to a plurality of users connected through communication lines, has been put to practical use. Users can enjoy movies they want to see at any time thanks to the data supplied from the video server.

In a video server, real-time output of the data to a plurality of users is needed. So a technique that enables efficient read out of the data from the disc control device is needed. There is a technique to arrange an order of the readout of the data so that the direction of head seek is kept in a one-way direction and the data are read from the disc control device efficiently.

FIG. 1 shows a block diagram of construction of a conventional disc control device. The disc control device comprises a hard disc 100, a queue control unit 101, and an arrangement control unit 102.

The hard disc 100 stores the multimedia data of a variety of movies, which are divided into the equal given sizes.

The queue control unit 101 holds the read requests of the data as queue, and outputs the read requests successively to the hard disc 100.

The arrangement control unit 102 stores the read requests in the queue control unit 101 temporarily each time the arrangement control unit 102 receives the read requests, and arranges all the read requests stored in the queue control unit 101 at a predetermined time, for a predetermined time period, so that the direction of the head seek in the disc control device is kept one-way. Then the queue control unit 101 outputs the arranged read requests successively to the hard disc 100. Then the average head seek time for the read requests in the hard disc 100 can be reduced.

However, in the conventional construction mentioned above, the delay time, which is the time period between the generation of the read request and the output of the data, varied greatly.

Specifically, the data has to be outputted from the video server successively at certain intervals, so that it is possible to play the movies. If the next data is not outputted within the interval, it is impossible to expect normal play of the movies as some images are skipped and sounds are stopped at some parts. So in the disc control device, a time range which can be allowed as an acceptable delay time is decided, the time range (limited allowable delay time) being the time period between the generation of the read request and the data output. However, the limited allowable delay time was not taken account of in the conventional art. For example, if the predetermined time period mentioned above (intervals for arrangement) is well shorter, the data can be outputted within the limited allowable delay time.

But in this case, it is impossible to read out data effectively, since the number of the read requests is less so that the effect of the reduction of the seek time is sacrificed. On the other hand, if the predetermined time period mentioned above is set longer, the number of the read requests increases, and the effect of the reduction of the seek time can be obtained. However, after the arrangement, some read requests might be moved to the position which cannot satisfy the limited allowable delay time in the queue.

In essence, the improvement of the efficiency of the readout of the disc and the observance of the limited allowable delay time are in the relationship of a trade-off in the conventional art. Specifically, if one goes well, the other suffers. Therefore, it is especially difficult to set the predetermined time period mentioned above properly, when the read requests are generated successively or at a burst.

SUMMARY OF THE INVENTION

It is an object of the present invention to provide a disc control device which can effectively output data from a disc, satisfying limited a allowable delay time which is needed between the generation of the read request and the data output.

The object may be fulfilled by a disc control device which shows the following features.

(1) A disc control device for holding a plurality of read requests as a queue, arranging the read requests and a newly inputted read request, reading out the read requests from the queue in the arranged order, and controlling the output of the requested data from a disc, comprises: a queue unit for temporarily holding the read requests as the queue in which the read requests can be arranged, the read requests requesting data readout from the disc; an allowable time hold unit for holding allowable time, which shows how much more delay can be allowed in order to satisfy delay time until the end of the data output, of each read request in the queue, the delay time being decided based on ranking in the read request in the queue; and an arrangement control unit for arranging the read requests in the queue along with the newly inputted read request in the queue based on the allowable time of each read request in the queue, each time a new read request is inputted.

(2) The disc control device may further include: an allowable time calculation unit, each time the arrangement is carried out, for calculating the allowable time of the inputted read request according to the ranking in the queue and storing the allowable time in the allowable time hold unit; and an allowable time update unit for updating the allowable time of each read request whose ranking in the queue is after the ranking of the inputted read request after the arrangement, the allowable time being in the allowable time hold unit and each updated value being smaller by a delay time created by the change of ranking.

(3) The allowable time update unit may further include: a first calculation unit for calculating a delay time of the inputted read request, each time the positions of the read requests are arranged by the arrangement control unit, the delay time being predicted to be needed to output data after the queue's moving up; and a second calculation unit for calculating the allowable time of the inputted read request by subtracting the delay time calculated by the first calculation unit from the limited allowable delay time which is between input of the inputted read request in the arrangement control unit and output of corresponding data from the disc.

(4) The arrangement control unit may include: a finding unit for finding a queue position which can keep direction of head seek one-way in case the inputted read request is inserted in the queue, each time a new read request is inputted; a time judgement unit for judging whether the allowable time of the read requests is below 0 in case the inputted read request is inserted at the found position, the read requests whose ranking being after the ranking of the read request inserted at the found position; a position decision unit for deciding a position, which is found when the time judgement unit judges that the allowable time is not below 0, as the position at which the read request should be inserted; and an arrangement unit for arranging the read requests in the queue along with the newly inputted read request, so that the newly inputted read request is inserted at the decided position.

(5) The read request may include a logical address of the data to be read out and data size; the queue unit may include: a queue table for holding, for each read request in the queue, the ranking in the queue, data transfer time needed to read out and output data right after head seek, a cylinder position on the disc at which corresponding data exist, and seek time needed for the head move between a cylinder position of the data corresponding to the read request and a cylinder position of preceding data, correlating them with each other; the arrangement control unit may further include: a cylinder position calculation unit for calculating the cylinder position based on the logical address included in the inputted read request; a data transfer time calculation unit for calculating the data transfer time based on the data size included in the inputted read request; a seek time calculation unit for calculating the seek time of the read requests whose ranking in the queue is changed, based on the cylinder position of the queue table, and storing the seek time in the queue table, each time the arrangement unit arranges the positions of the read requests in the queue; the search unit may include: a ranking designation unit for designating ranking of the read requests in the queue one by one from the end; a direction judgement unit for judging whether a cylinder position of the read request at the end of the queue and a cylinder position of the read request whose ranking is designated are in the same direction from a cylinder position calculated by the cylinder position calculation unit, each time the ranking is designated; wherein the arrangement unit may update the ranking of the queue table in order to insert the read request at the decided position, and stores the cylinder position calculated by the cylinder position calculation unit and the data transfer time calculated by the data transfer time calculation unit in the queue table, correlating them with the inputted read request.

(6) The time judgement unit may subtract the data transfer time from the allowable time corresponding to the read request whose ranking is designated by the ranking designation unit in order to check whether the result is below 0, when judgement by the direction judgement unit is "in the same direction"; and the position decision unit may decide a position between two adjacent read requests as the position at which the inputted read request should be inserted, in case the judgement by the direction judgement unit is "in the same direction" and judgement by the time judgement unit is not below 0 for the former read request, and the judgement by the direction judgement unit is "not in the same direction" for the latter read request whose ranking is designated to be next to the ranking of the former read request by the ranking designation unit.

(7) The first calculation unit may calculate the delay time of the inputted read request by adding the data transfer time and the seek time of all the read requests whose ranking is before the ranking of the inputted read request in the queue, each time the arrangement unit arranges the positions of the read requests in the queue; and the allowable time update unit may update the allowable time, in the allowable time hold unit, of each read request whose ranking in the queue is after the ranking of the inputted read request after the arrangement, each updated value being smaller by the data transfer time of the inputted read request.

According to the disc control device of the above construction, the access efficiency of the disc can be further improved as the positions of the read requests in the queue are arranged each time a new read request is inputted, and the limited allowable delay time is satisfied.

(8) The limited allowable delay time may be included in the inputted read request.

According to the disc control device of the above construction, the limited allowable delay time can be different for each read request, and it satisfies the data quality needed for the read request.

(9) The position decision unit may decide that the read request should be inserted at the end of the queue, in case the judgement by the direction judgement unit is "in the same direction" and the judgment by the time judgement unit is below 0; the read request may be classified into either a high priority request, whose allowable time is relatively short and which can be discarded, or other request; the arrangement judgement control unit may further include: a high priority request judgement unit for judging whether the inputted read request is the high priority request; a discard judgement unit for judging that the read request should be discarded if the result of the addition of the data transfer time and the seek time of the all read requests in the queue table is greater than the allowable time of the high priority request, in case the high priority request judgement unit judges that the read request is the high priority request and the position decision unit decides that the high priority request should be inserted at the end of the queue; and a discard unit for discarding the high priority request about which the judgement by the discard judgement unit is "discard", and for prohibiting the operations of the arrangement control unit for the high priority request.

According to the disc control device of the above construction, the high priority request can be outputted in a short delay time, but it is highly probable that the priority request in speed will be discarded. So, if data on the disc represent a movie, "fast forward" and "reverse play" can be inputted as high priority requests. Then data can be read out efficiently, while the two kinds of data quality are satisfied.

(10) It is possible to substitute "a search unit in claim 18" for "a search unit in claim 6", and "a direction judgement unit in claim 19" for "a direction judgement unit in claim 7".

According to the disc control device of the above construction, reverse of the direction of the head seek can be allowed only in case the adjacent cylinder positions are very close to each other.

BRIEF DESCRIPTION OF THE DRAWINGS

These and other objects, advantages and features of the invention will become apparent from the following description thereof taken in conjunction with the accompanying drawings which illustrate a specific embodiment of the invention, In the drawings:

FIG. 5A is a queue table.

FIG. 5B is an allowable delay data table.

FIGS. 8A, 8B, and 8C are concrete examples of the queue table and the allowable delay data table.

DESCRIPTION OF THE PREFERRED EMBODIMENT (Embodiment 1)

Figure 1:
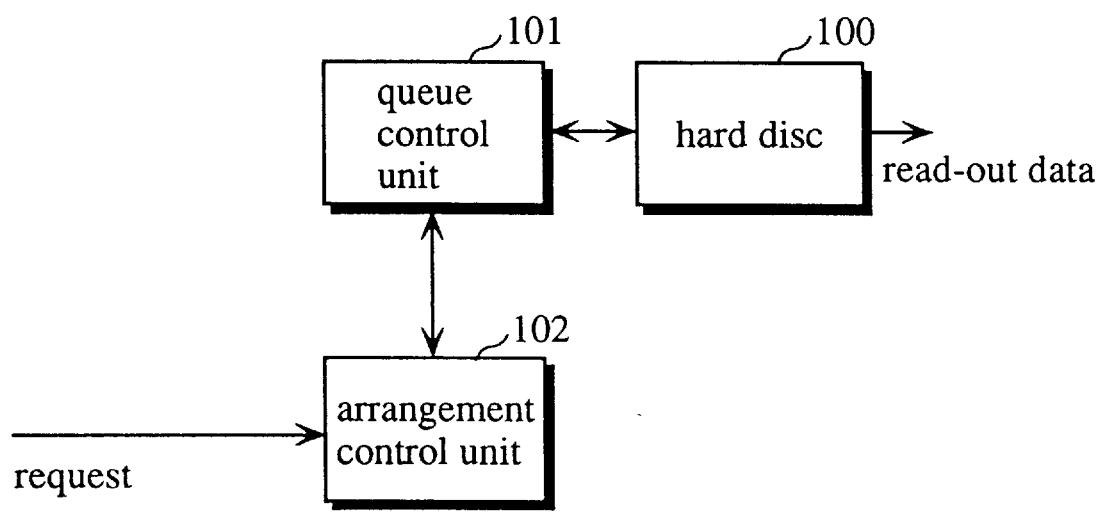
FIG. 1 is a schematic diagram of the construction of a conventional disc control device.
Figure 2:
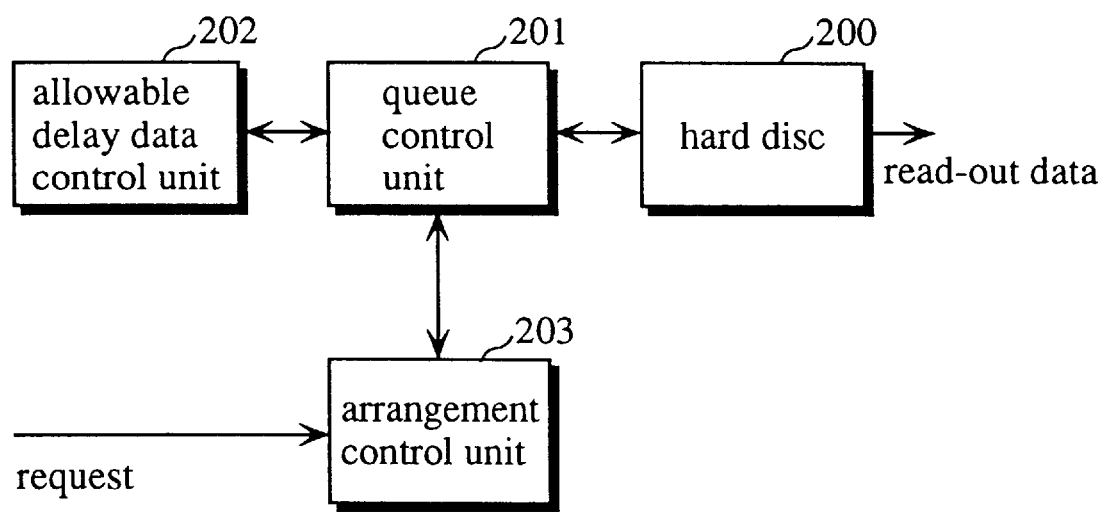
FIG. 2 is a schematic diagram of the construction of a disc control device according to the embodiment of the present embodiment.

FIG. 2 shows a schematic diagram of the construction of a disc control device of Embodiment 1 of the present invention. In this figure, the disc control device comprises a hard disc 200, a queue control unit 201, an allowable delay data control unit 202, and an arrangement control unit 203. The disc control device reduces the seek time by arranging the order of the read requests inputted successively, and outputs data within the limited allowable delay time.

The hard disc 200 is included in the hard disc drive and stores a variety of multimedia data, which are divided into the equal given sizes. When the present disc control device is applied to a video server, the hard disc 200 stores a variety of movies, which are divided into the given sizes (64 Kbyte).

Figure 3:
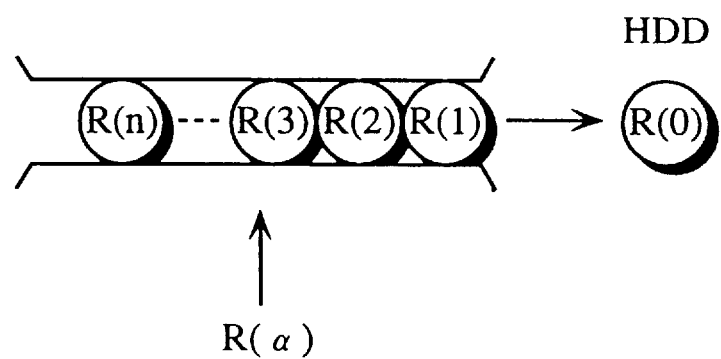
FIG. 3 is a schematic diagram showing how read requests are controlled by as a queue according to the present embodiment.

The queue control unit 201 holds the read requests inputted successively as queue waiting for processing, and outputs the read requests to the hard disc 200 in order. FIG. 3 shows a schematic representation of the queue. In this figure, R(1)–R(n) show the read requests in the queue. The read request R(1) at the top of the queue is outputted when the output of R(0) in the hard disc 200, which is just before R(1), is completed. R($\alpha$) shows a newly generated read request.

The allowable delay data control unit 202 holds the allowable delay data for each read request in the queue. The allowable delay data shows how much more the read request can be delayed in order to satisfy the limited allowable time in terms of the queue position. Specifically, the allowable delay data is newly calculated for each read request newly added in the queue. The allowable delay data is updated for the read requests in the queue, whose ranking is moved to after the ranking of the inputted read request just after the arrangement. The updated value is smaller by the delay time created by the change of ranking.

The arrangement control unit 203 inserts the inputted read request in the queue position which reduces the seek time, referring to the allowable delay data controlled by the allowable delay data control unit 202, each time the read request is inputted.

The explanation on a user control unit which supplies the read requests to the arrangement control unit 203 follows next, although it is not illustrated in FIG. 2. When a movie is requested by a user, the video server has to supply a plurality of data constituting the movie to users successively and simultaneously. Receiving the request of the movie from the user, the user control unit issues read requests of each data corresponding to the movie to the arrangement control unit 203 successively. The read request includes logical address, data size, and limited allowable delay time. The logical address shows the top of the data to be read out on the hard disc 200. The data size is the size of the data to be read out, for example, about 64 kbyte. The limited allowable delay time is the condition for successive play of the data at users' end. It shows the delay time between the generation of the read request and the output of the data from the hard disc 200.

(Detailed Construction)

Figure 4:
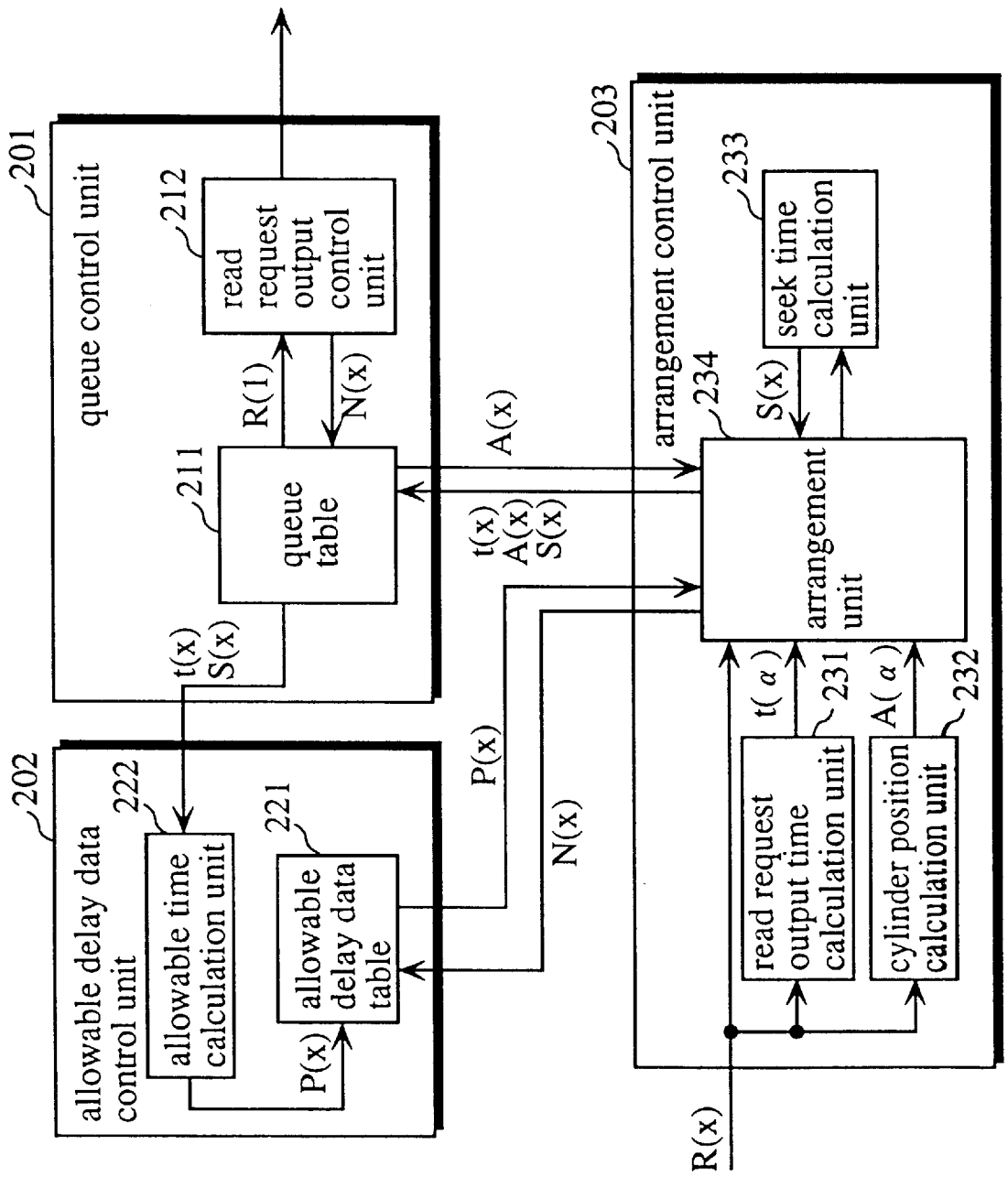
FIG. 4 is a block diagram showing the detailed construction of the disc control device according to the embodiment of the present invention.

FIG. 4 is a block diagram of the present disc control device more in detail. The queue control unit 201 comprises a queue table 211, and a read request output control unit 212. The allowable delay data control unit 202 comprises an allowable delay data table 221 and a limited allowable delay time calculation unit 222. The arrangement control unit 203 comprises a read request output time calculation unit 231, a cylinder position calculation unit 232, a seek time calculation unit 233, and an arrangement unit 234.

The queue table 211 is a table for controlling the read requests as queue logically. FIG. 5A shows an example of the construction of the queue table 211. The queue table 211, stores ranking x, read request output time t(x), cylinder position A(x), and seek time S(x), correlating them with each read request R(x) in the queue. Arrangement of the positions of the read requests in the queue is carried out by the change of values in the queue table. The "ranking x" is the ranking of the read requests in the queue. The top of the queue is represented by ranking 1, and the end of the queue is represented by ranking n. This n also means the length of the queue. The "read request output time t(x)" is the maximum time needed to read out data after the head seek, the read request output time t(x) being created by adding the maximum rotation wait time on the cylinder to the time to read out and output the data corresponding to the read request R(x) in the hard disc 200. The "cylinder position A(x)" shows the position in which the data corresponding to the read request x is written. The "seek time S(x)" is the time needed to move the head from A(x−1) to A(x).

The read request output control unit 212 detects whether the hard disc 200 is in the state of access or ready, immediately outputs the read request R(1) at the top of the queue table 211 to the hard disc 200 when the state is ready, and operates so that the corresponding data is read out from the hard disc 200. At this point, the read request output control unit 212 deletes the removed read request R(1) and the relating data from the queue table 211 and the allowable delay data table 221, and updates the ranking x of the rest of the read requests (in other words, moves up the ranking).

The allowable delay data table 221 is a table for holding the allowable delay data P(x) corresponding to each read request R(x) in the queue table 211. FIG. 5B shows an example of the construction of the allowable delay data table 221. As illustrated, the allowable delay data table 221 stores allowable delay data P(x), a prohibition flag flg(x), correlating them with each read request R(x) in the queue. The "allowable delay data P(x)" shows the allowable time which shows to what extent can the delay of the read request R(x) be possible. When the "prohibition flag flg(x)" is ON, new read request cannot be inserted before the read request R(x), and the direction of the head seek before and after the read request R(x) is reversed.

The limited allowable delay time calculation unit 222 calculates the allowable delay data of the added read request and read requests whose ranking is after the ranking of the added read request, referring to the queue table 211 and stores them in the allowable delay data table 221, each time a read request is added to the queue table 211 by the arrangement unit 234. Formula (1) is applied to the calculation for the added read request.

$$P(x) = T(x) - \left( \sum_{i=1}^{x} S(i) + \sum_{i=1}^{x} t(i) \right) \quad (1)$$

T(x) is the limited allowable delay time of the read request R(x). Formula (2) is applied to the calculation for the read requests whose ranking is after the ranking of the added read request.

$$P(X) = P(x) - t(\alpha) \quad (2)$$

Formula (2) means that P(x) is updated by subtracting the read request output time t(α) of the added read request from P(x) of each read request whose ranking is after the ranking of the added read request. In Formula (2), as the effect to seek time (x) by the addition of the read request R(α) is so small, it is not taken into consideration for simplification of the calculation. In this way, P(x) in the queue table 221 is newly calculated for the added read request in the queue. Later, P(x) is updated for the read requests whose ranking is moved to later ranking. The updated value is smaller by the delay time created by the change of ranking.

The read request output time calculation unit 231 calculates the read request output time t(α) corresponding to R(α) when the read request R(α) is newly inputted in the arrangement control unit 203. This read request output time t(α) is calculated in the following way. 1. The size of the data to be read out is divided by the minimum data transfer speed of the hard disc 200. 2. Then the maximum rotation wait time of the hard disc 200 is added. For example, if the data size is 64 kbyte and the minimum data readout speed is 2.7 Mbyte/S, and the maximum rotation wait time is 11.2 mS, the read request output time t(α) is 64 k/2.7M+11.2=about 35 mS.

The cylinder position calculation unit 232 calculates the cylinder position A(α) corresponding to the read request R(α), when the read request R(α) is newly inputted in the arrangement control unit 203. Specifically, when one-cylinder data size of the most interior cylinder and that of the most exterior cylinder are equal, the cylinder position calculation unit 232 calculates A(α) based on the logical address LAmin of the most interior cylinder of the hard disc 200, the logical address LAmax of the most exterior cylinder, the logical address LAα of R(α), and all the cylinder numbers, TNs.

$$A(\alpha) = TN \cdot (LA\alpha - LAmin)/(LAmax - LAmin)$$

The seek time calculation unit 233 calculates the seek time S(x) of the added read request and read requests whose ranking is after the ranking of the added read request, each time the read request R(α) is added to the queue table 211 by the arrangement unit 234. Specifically, the seek time calculation unit 233 divides the distance between A(x)–A(x−1) by the head-seek speed of the hard disc 200.

The arrangement unit 234 arranges all the read requests in the queue and R(α) by referring to the queue table 211 and the allowable delay data table 211 based on the read request output time t(α) and the seek time S(α), when the read request R(α) is inputted newly, so that the limited allowable delay time is satisfied, and the direction of the head seek is kept almost one-way.

Figure 6:
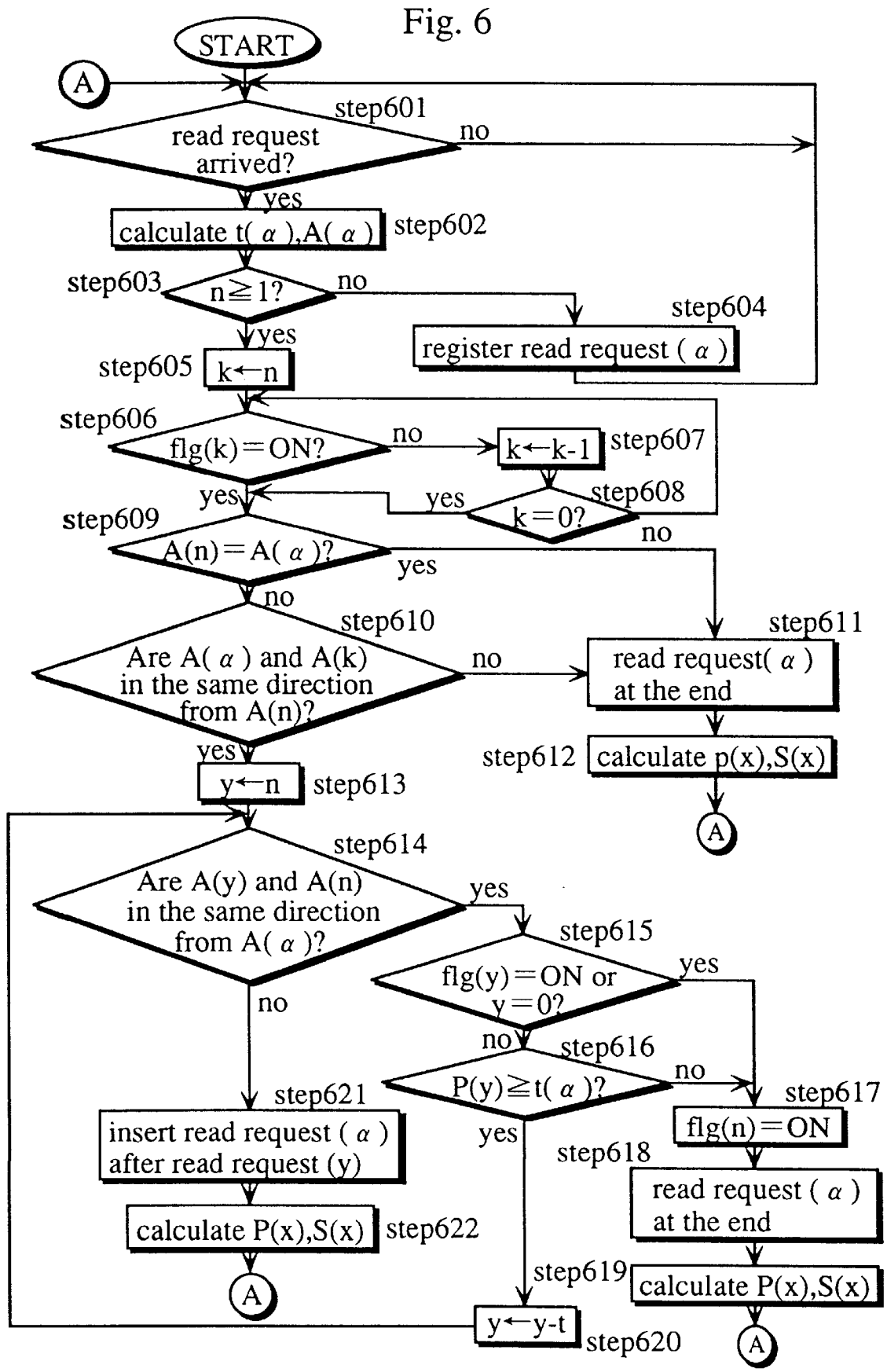
FIG. 6 is a detailed flow chart of the arrangement processing.

FIG. 6 is a flow chart which shows the detailed arrangement processing of the arrangement unit 234. The read request R(α) is inputted (Step 601). The arrangement unit 234 makes the read request output time calculation unit 231 and the cylinder position calculation unit 232 calculate the read request output time t(α) and the cylinder position A(α), respectively (Step 602). When the length of the queue n in the queue table is 0 (Step 603: no), the arrangement unit 234 registers the next four items in the queue table 211; the read request R(α), the read request output time t(α), the cylinder position A(α), and the seek time S(α) calculated in the seek time calculation unit 233. Also, the arrangement unit 234 registers the next two items in the allowable delay data table 211; the allowable delay data P(α) calculated in the limited allowable delay time calculation unit 222 and the prohibition flag flg(α) which is OFF. (Step 604).

When the length of the queue n is more than 1 (Step 603: yes), the arrangement unit 234 detects the read request R(k), whose prohibition flag is ON, referring to the prohibition flag(k) in the allowable delay data table 221, as the parameter k which reduces one by one from n (Steps 606–608).

When the cylinder position A(α) of the read request R(α) corresponds to the cylinder position A(n) of the read request R(n) at the end of the queue (Step 609: yes), the arrangement unit 234 registers the read request R(α), t(α), and A(α) at the end of the queue in the queue table 211 (Step 611), and makes the limited allowable delay time calculation unit 222 and the seek time calculation unit 233 calculate the allowable time P(α) and the seek time S(α), respectively, and registers P(α) and S(α) in the allowable delay data table 221 and the queue table 221, respectively. (Step 612).

(Step 609: no) When the cylinder position A(α) of the read request R(α) is not the same with the cylinder position A(n) of the read request R(n) at the end of the queue, the arrangement unit 234 judges whether the cylinder position A(α) and the cylinder position A(k) are in the same direction from the cylinder position A(n). Specifically, the judgement of the arrangement unit 234 is based on the result of the multiplication of the (A(k)–A(n)) and (A(α)–A(n)). When the result is a positive value, A(α) and A(k) are in the same direction. When the result is a negative value, they are in the opposite directions (Step 609: no).

Figure 7A:
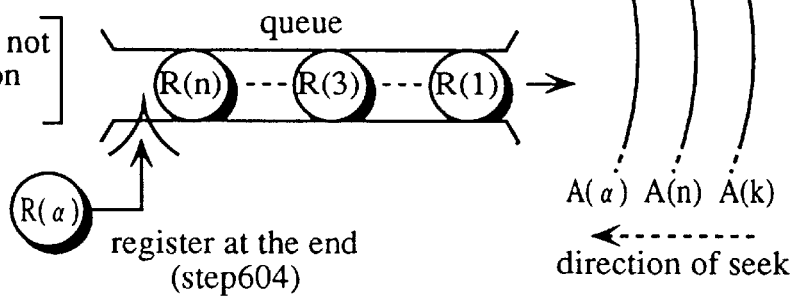
FIGS. 7A, 7B, and 7C are schematic representation of the arrangement.

When the cylinder position A(α) and the cylinder position A(k) are not in the same direction (Step 610: no), the arrangement unit 234 registers the read request R(α) at the end of the queue, as shown in FIG. 7A (Step 611), and makes the limited allowable delay time calculation unit 222 and the seek time calculation unit 233 calculate P(α) and S(α) respectively, and registers t(α), A(α), S(α), P(α), and flg(α) in the queue table 211 and the allowable delay data table 211. In this case, the direction of the head seek in the hard disc 200 is kept one-way as shown in FIG. 7A; from A(k) to A(α), via A(n) (Step 612).

When the cylinder position A(α) and the position A(k) are in the same direction, the arrangement unit 234 carries out the following processing for the individual read request R(y) in the queue, as the parameter y which reduces one by one from n (Step 610: yes).

Figure 7B:
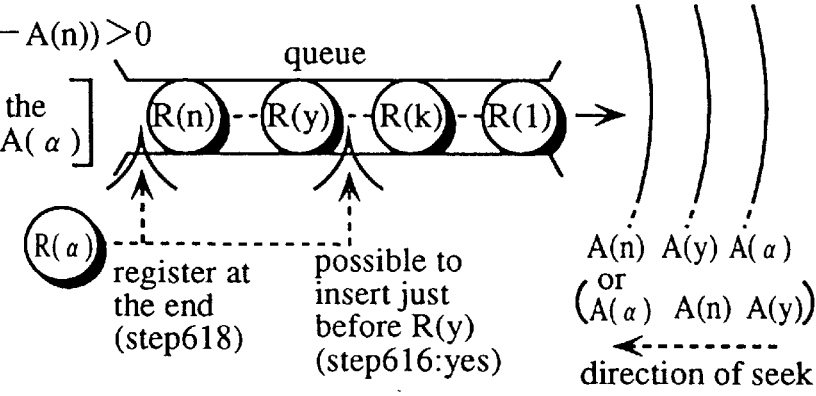

First, the arrangement unit 234 checks whether it is possible to satisfy the limited allowable delay time of R(y) and keep the direction of the head seek one-way, even if R(α) is inserted just before R(y). FIG. 7B shows the schematic representation of this. When A(y) and A(n) are in the same direction from the position of A(α) (Step 614: yes), flg(y) is OFF (Step 615: no), and P(y)≧t(α) is effective (Step 616: yes), the arrangement unit 234 judges it is possible to insert R(α) just before R(y). When the limited allowable delay time is not satisfied (P(y)≧t(α) is not effective) (Step 616: no), the arrangement unit 234 turns the flg(n) ON (Step 617), and registers R(α) at the end of the queue (Steps 618, 619). The reason why the flg(n) is ON, is not to arrange all the read requests in the queue except for the R(α) registered at the end, and to reverse the direction of the head seek after R(α).

Figure 7C:
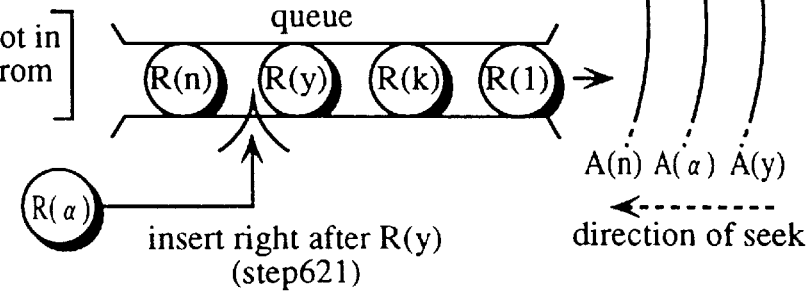

When the arrangement unit 234 judges it is possible to insert R(α) just before R(y) (Step 616: yes), the arrangement unit 234 judges, for the preceding read request after the update of the variable y=y−1, whether it is possible to keep the direction of the head seek one-way even if R(α) is inserted just before R(y). This judgement is based on whether A(y) and A(n) are in the same direction from the position of A(α) (Step 620). When the arrangement unit 234 judges it is possible to keep the direction of the head seek one-way, this unit 234 carries out the processing after Step 615 as described above (Step 614: yes). When the arrangement unit 234 judges it is impossible to keep the direction of the head seek one-way (Step 614: no), the arrangement unit 234 inserts R(α) right after R(y) (Steps 621, 622). FIG. 7C shows a schematic representation of this.

The following explanation is about the operations of the disc control device constructed in the above mentioned way.

Suppose that the read request R(1)–R(5) are already stored in the queue table 211 and the allowable delay data table 221, as shown in FIG. 8A: the limited allowable delay time for all the read requests is 300 mS; data size is 64 kbyte; the maximum seek time of the hard disc 200 is 20 mS; the maximum rotation wait time is 11.2 mS; the maximum data transfer speed is 5.5 Mbyte; the minimum data rotation speed is 2.7 Mbyte; the cylinder number is 2000. Then, the read request output time t(x)=35 mS can be obtained from 64 kbyte/2.7 Mbyte+11.2 mS.

When the read request R(6) is newly inputted in the arrangement control unit 203 in this state, the read request output time calculation unit 231 calculates the read request output time t(6), which is 35 mS. The cylinder position calculation unit 232 calculates the cylinder position A(6). Suppose that the calculated A(6) is 300. The read request R(6) is registered at the end of the queue, since A(6) and A(2) are not in the same direction from A(5) at the end as shown in FIG. 7A. FIG. 8B shows the result of the registration. When the read request R(7) is newly inputted in the arrangement control unit 203 in this state, the read request output time calculation unit calculates the read request output time t(7), which is 35 mS. Suppose that the calculated A(7) is 1300. The arrangement unit 234 judges that A(7) (=1300) and A(2) (=2000) are in the same direction from the position of A(6) at the end. (See FIG. 6, Step 610). Moreover, in order to decide where in the queue can R(7) be inserted, the arrangement unit 234 judges whether A(y) and A(6) (=500) are in the same direction from the position of A(7) (=1300). When the volume of y is 6, 5, and 4, it is possible to insert R(7) just before R(y) since they are in the same direction and the allowable delay data P(y) is larger than t(7) as shown in FIG. 7B. (A loop of Steps 614–616, 620 is repeated three times.)

When the volume of y is 3, A(3) (=1500) and A(6) (=500) are not in the same direction from the position of A(7) (=1300), as shown in FIG. 7C. (See FIG. 6, Step 614) The arrangement unit 234 decides that R(7) should be inserted right after R(3) (See Step 621). FIG. 8c shows the state in which R(7) is inserted right after R(3). In this case, it is already proven by the above mentioned 3-time-repeated loop that the each limited allowable delay time of R(6)–R(4) can be satisfied. Since R(7) is inserted at such a position that the direction of head seek is kept one-way, the readout efficiency of the disc is improved.

The following is the supplementary explanation about the limit of the performance of the disc control device. Suppose that the read request R(8) is inputted in the state of FIG. 8C. At this point, P(7) is 21 mS, and t(8) is 35 mS. So P(7)≧t(8) is not satisfied (Step 616: no). So R(8) will be registered at the end of the queue. At this point, P(8) is smaller than 0. So R(8) does not satisfy the limited allowable delay time, which means that too many read requests beyond the capacity of the disc control device are inputted. Improvement of the readout efficiency of the disc control device means improvement of the capacity of the disc control device.

As explained above, the present disc control device improves readout efficiency of the disc, satisfying the limited allowable delay time for each read request output time.

Figure 9:
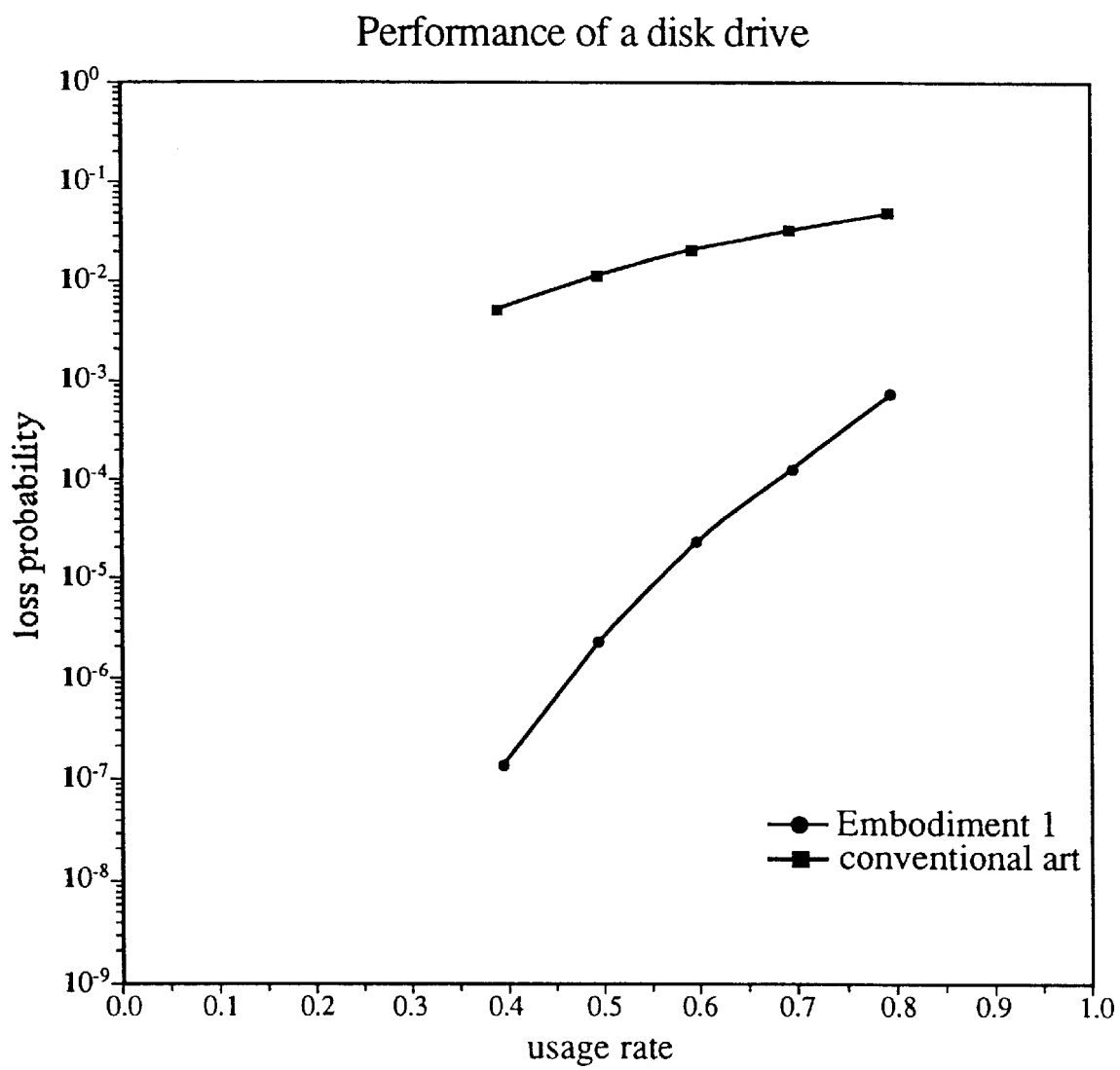
FIG. 9 is the result of the simulation of the characteristics of the usage rate—loss probability of the disc control device of the present invention and the conventional disc control device.

FIG. 9 shows the result of the simulation of the characteristics of usage rate—loss probability. In this figure, "usage rate" on abscissa shows the ratio of the amount of the readout data, in case data acquisition amount is supposed to be 1.0 when 64 kbyte data are read out randomly and successively. The data-acquisition amount (usage rate is 1.0), can be obtained from the next formula, in which an average data transfer time, an average rotation wait time, an average seek time of the hard disc 200 are expressed as T transmit, T wait, T seek, respectively.

$$\text{data acquisition amount} = \frac{\text{data size (64byte)}}{T \text{ transmit} + T \text{ wait} + T \text{ seek}}$$

The "loss probability" on the ordinate shows the ratio of the read requests whose corresponding data are discarded after the readout because the limited allowable delay time is not satisfied. As shown in FIG. 9, the discard rate of the present disc control device is smaller than that of the prior art by two to four figures ($10^{-2}$ to $10^{-4}$ times smaller), which shows that the readout efficiency of the present disc is improving.

(Embodiment 2)

Figure 10:
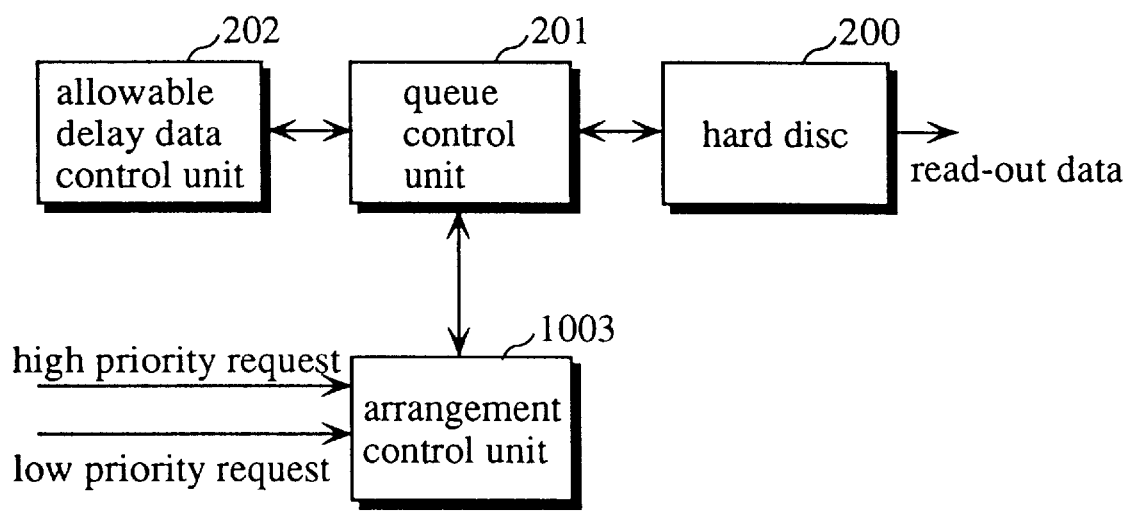
FIG. 10 is a schematic diagram of the construction of the disc control device according to Embodiment 2 of the present invention.

The following explanation is about the second embodiment of the present invention. FIG. 10 shows a block diagram of the construction of Embodiment 2 of the present invention. The same numbers are given to the same construction elements shown in FIG. 2, and explanations on them are omitted. Explanation on only the different points follows next.

The disc control device in FIG. 10 differs from that in FIG. 2 in the next points: the disc control device in FIG. 10 is equipped with an arrangement control unit 1003 instead of the arrangement control unit 203 in Embodiment 1, and receives high priority requests which need to be read out with high priority, in addition to the read requests (low priority request) in Embodiment 1. The high priority requests can be discarded, even though the limited allowable delay time cannot be satisfied. For example, when a user designates fast forward or reverse play in the video server, a little skipping of the data which should be supplied to users can be allowed, but the delay time should be minimized. The high priority requests are used in such a case. Compared to the high priority requests, the low priority requests have longer limited allowable delay time, but the discard should be minimized. In a video server, low priority requests correspond to the normal play.

In FIG. 10, the arrangement control unit 1003 receives the high priority requests in addiction to the low priority requests, and registers both requests in the queue positions which satisfy the limited allowable delay time of the read requests already held in the queue. This is the same as the case in Embodiment 1. When the limited allowable delay time of the high priority requests cannot be satisfied at the above queue positions, the high priority requests are discarded.

Figure 11:
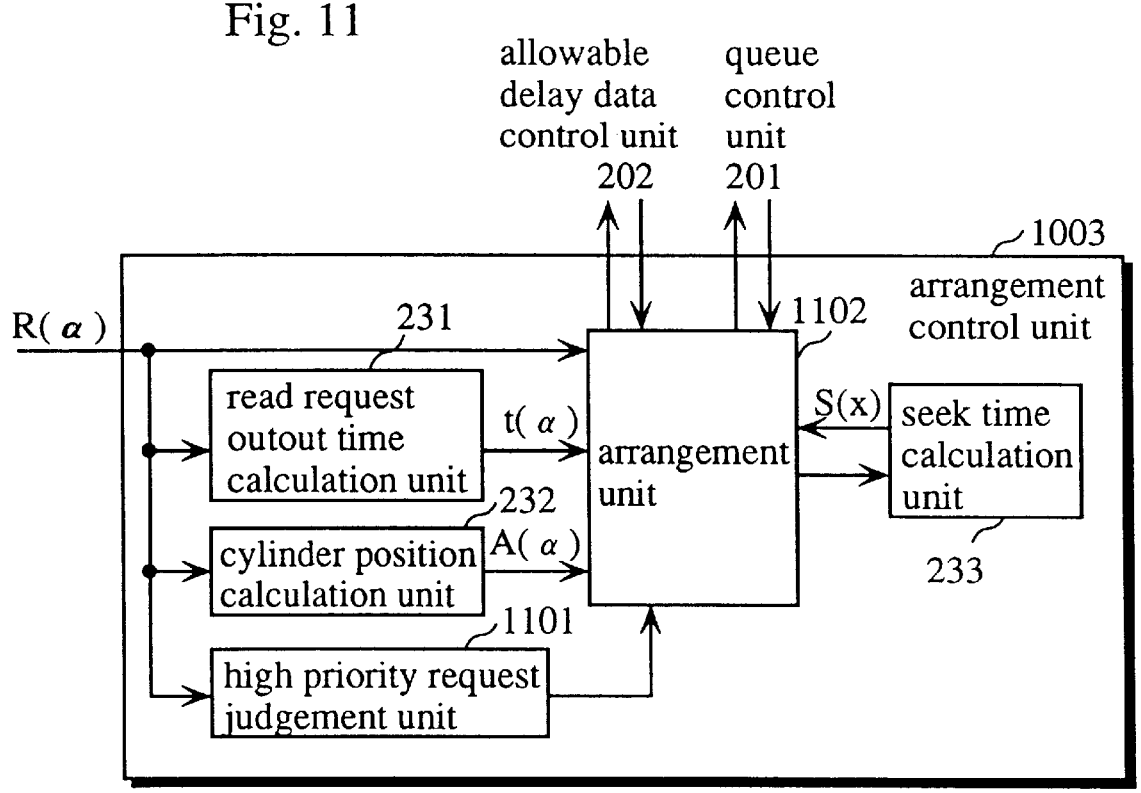
FIG. 11 is a block diagram of the detailed construction of an arrangement control unit.

FIG. 11 shows the detailed construction of the arrangement control unit 1003. Explanation is given on a high priority request judgement unit 1101 and an arrangement unit 1102 only, since other units are the same as the ones in Embodiment 1.

Each time a read request is inputted, the high priority request judgement unit 1101 judges whether it is the high priority request or the low priority request, and post the information to the arrangement unit 1102. For example, the high priority request judgement unit 1101 holds the threshold value of 150 mS beforehand, and judges that the read request is high priority request when the limited allowable delay time is less than 150 mS, and low priority request when more than 150 mS.

Figure 12:
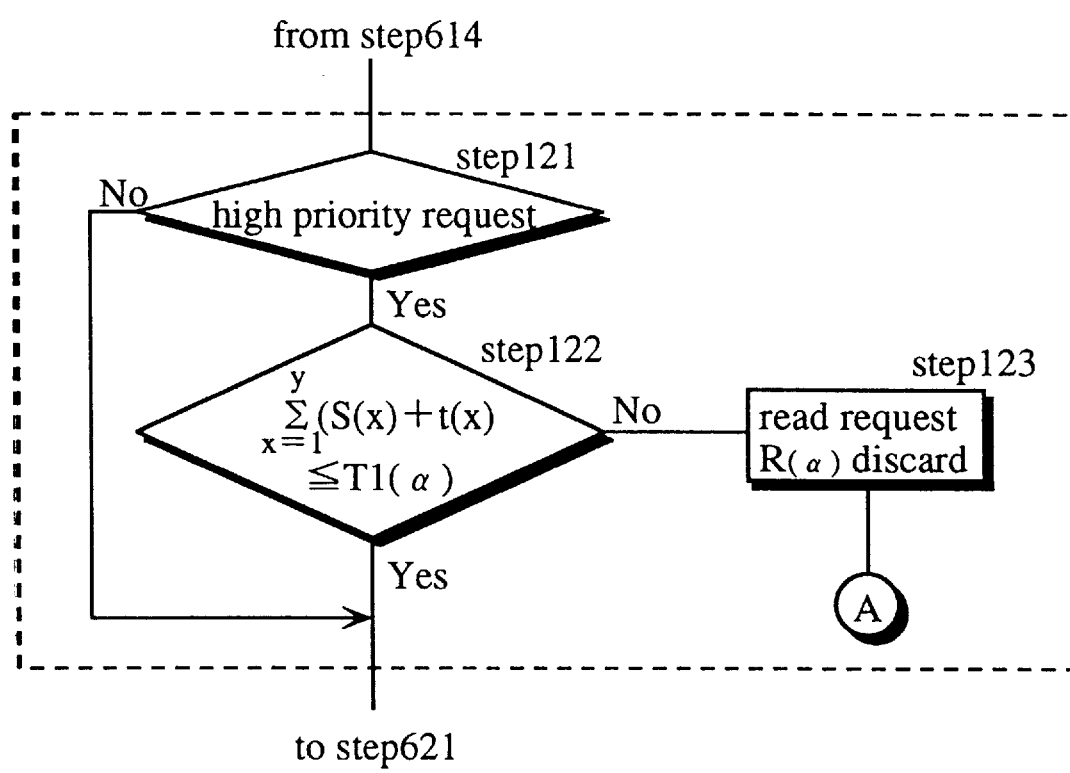
FIG. 12 is a flow chart showing the processing of the arrangement control unit.

The arrangement unit 1102 operates for low priority requests exactly in the same way as the case in Embodiment 1, but discards the high priority request if the limited allowable delay time is not satisfied. For the reference of the detailed processing of the arrangement unit 1102, FIG. 12 should be inserted between Step 614 and Step 621 in FIG. 6. In FIG. 12, when the high priority request judgement unit 1101 judges that read request R(y) is the high priority request (Step 121: yes), and t1(y) is bigger than T1($\alpha$), t1(y) being the time needed for the completion of the readout of the read request R(y) in the queue, and T1($\alpha$) being the limited allowable delay time of the high priority request (Step 122: yes), the arrangement unit 1102 registers R($\alpha$) right after R(y) (Step 621), and discards R($\alpha$) when t1(y) is smaller than T1($\alpha$) (Step 123). Next formula shows how to obtain t1(y).

$$t1(y) = \sum_{i=1}^{y} (S(i) + t(i))$$

As explained above, the arrangement unit 1102 decides where in the queue should the high priority request be inserted like the case of low priority request, and when the limited allowable delay time cannot be satisfied, the arrangement unit 1102 discards the high priority request. So the low priority request and the high priority request can be processed according to the requested quality.

Moreover, in Embodiment 1 and 2, the read requests are arranged so that the direction of the head seek is kept one-way. But if the interval between the cylinder positions of the adjacent read requests is small, the read request can be arranged in a way so that the direction of the head seek is reversed partly. For example, if the interval is 5, the formula of Step 614 in FIG. 6 can be changed to the next ones. "Offset" is 5.

(A($\alpha$)+offset−A(y)) (A($\alpha$)−A(n))>0

(A($\alpha$)−offset−A(y)) (A($\alpha$)−A(n))>0

When either formula is satisfied, Step 615 follows after Step 614. When both of them are not satisfied, Step 621 follows.

In Embodiment 1, all the limited allowable delay time is 300 mS, but they can be different according to each read request. In such a case, the limited allowable delay time of each read request can be satisfied, since the allowable delay data P(x) is calculated based on the limited allowable delay time T(x) of each read request, as shown in Formula (1).

In Embodiment 2, the high priority request judgement unit 1101 judges whether the read request is high priority request or low priority request by comparing the limited allowable delay time and the threshold value. But it is also possible to embed information showing "priority" or "normal" (e.g. flag) in the read request.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A disc control device for holding a plurality of read requests as a queue, arranging the read requests and a newly inputted read request, reading out the read requests from the queue in the arranged order, and controlling the output of the requested data from a disc, comprising:

queue means for temporarily holding the read requests as the queue in which the read requests can be arranged, the read requests requesting data readout from the disc;

allowable time hold means for holding allowable time, which shows how much more delay can be allowed in order to satisfy delay time until the end of the data output, of each read request in the queue, the delay time being decided based on ranking in the read request in the queue; and arrangement control means for arranging the read requests in the queue along with the newly inputted read request in the queue so that the allowable time of each read request in the queue is not 0, each time a new read request is inputted, including, finding means for finding a queue position which can keep direction of head seek in a one-way direction in case the inputted read request is inserted in the queue, each time a new read request is inputted;

time judgement means for judging whether the allowable time of the read requests is below 0 in case the inputted read request is inserted at the found positions, the read requests whose ranking being after the rankirm of the read request inserted at the found position;

position decision means for deciding a position, which is found when the time judgement means judges that the allowable time is not below 0, as the position at which the read request should be inserted; and arrangement means for arranging the read requests in the queue along with the newly inputted read request, so that the newly inputted read request is inserted at the decided position.

2. The disc control device of claim 1, further includes:

allowable time calculation means, each time the arrangement is carried out, for calculating the allowable time of the inputted read request according to the ranking in the queue and storing the allowable time in the allowable time hold means; and allowable time update means for updating the allowable time of each read request whose ranking in the queue is after the ranking of the inputted read request after the arrangement, the allowable time being in the allowable time hold means and each updated value being smaller by a delay time created by the change of ranking.

3. The disc control device of claim 2, wherein the allowable time update means further includes:

first calculation means for calculating a delay time of the inputted read request, each time the positions of the read requests are arranged by the arrangement control means, the delay time being predicted to be needed to output data after the queue's moving up; and second calculation means for calculating the allowable time of the inputted read request by subtracting the delay time calculated by the first calculation means from the limited allowable delay time which is between input of the inputted read request in the arrangement control means and output of corresponding data from the disc.

4. The disc control device of claim 3, wherein the limited allowable delay time is already set equal for all the read requests.

5. The disc control device of claim 3, wherein the limited allowable delay time is included in the inputted read request.

6. The disc control device of claim 1, wherein the read request includes a logical address of the data to be read out and data size;

the queue means includes:

queue table for holding, for each read request in the queue, the ranking in the queue, data transfer time needed to read out and output data right after head seek, a cylinder position on the disc at which corresponding data exist, and seek time needed for the head move between a cylinder position of the data corresponding to the read request and a cylinder position of preceding data, correlating them with each other;

the arrangement control means further includes:

cylinder position calculation means for calculating the cylinder position based on the logical address included in the inputted read request;

data transfer time calculation means for calculating the data transfer time based on the data size included in the inputted read request;

seek time calculation means for calculating the seek time of the read requests whose ranking in the queue is changed, based on the cylinder position of the queue table, and storing the seek time in the queue table, each time the arrangement means arranges the positions of the read requests in the queue;

the search means includes, ranking designation means for designating ranking of the read requests in the queue one by one from the end;

direction judgement means for judging whether a cylinder position of the read request at the end of the queue and a cylinder position of the read request whose ranking is designated are in the same direction from a cylinder position calculated by the cylinder position calculation means, each time the ranking is designated;

wherein the arrangement means updates the ranking of the queue table in order to insert the read request at the decided position, and stores the cylinder position calculated by the cylinder position calculation means and the data transfer time calculated by the data transfer time calculation means in the queue table, correlating them with the inputted read request.

7. The disc control device of claim 6, wherein the time judgement means subtracts the data transfer time from the allowable time corresponding to the read request whose ranking is designated by the ranking designation means in order to check whether the result is below 0, when judgement by the direction judgement means is "in the same direction"; and the position decision means decides a position between two adjacent read requests as the position at which the inputted read request should be inserted, in case the judgement by the direction judgement means is "in the same direction" and judgement by the time judgement unit is not below 0 for the former read request, and the judgement by the direction judgement means is "not in the same direction" for the latter read request whose ranking is designated to be next to the ranking of the former read request by the ranking designation means.

8. The disc control device in claim 7, wherein the first calculation means calculates the delay time of the inputted read request by adding the data transfer time and the seek time of all the read requests whose ranking is before the ranking of the inputted read request in the queue, each time the arrangement means arranges the positions of the read requests in the queue; and the allowable time update means updates the allowable time, in the allowable time hold means, of each read request whose ranking in the queue is after the ranking of the inputted read request after the arrangement, each updated value being smaller by the data transfer time of the inputted read request.

9. The disc control device of claim 8, wherein the limited allowable delay time is already set equal for all the read requests.

10. The disc control device of claim 9, wherein the position decision means decides that the read request should be inserted at the end of the queue, when the judgement by the direction judgement means is "in the same direction" and the judgement by the time judgement means is below 0.

11. The disc control device of claim 10, wherein the allowable time hold means further holds a prohibition flag, for each read request in the queue, which shows that other read requests cannot be inserted just before the read requests in the queue and that the direction of head seek is reversed, when the state of the flag is set; and the arrangement means sets a prohibition flag corresponding to the read request just before the read request inserted at the end of the queue after the arrangement, when the judgement by the direction judgement means is "in the same direction", the judgement by the time judgement means is below 0, and the position decision means decides that the read request should be inserted at the end of the queue.

12. The disc control device of claim 11, wherein the arrangement control means further includes:

prohibition flag detection means for detecting the read request whose prohibition flag in the allowable time hold means is set and which is closest to the end of the queue when a new read request is inputted;

flag direction judgement means for judging whether a cylinder position of the inputted read request and a cylinder position of the detected read request are in the same direction from the cylinder position of the read request at the end of the queue;

wherein the position decision means decides that the inputted read request should be inserted at the end of the queue, in case judgement by the flag direction judgement means is "not in the same direction"; and the search means carries out the search in case the judgement by the flag direction judgement means is "in the same direction".

13. The disc control device of claim 8, wherein the limited allowable delay time is included in the inputted read request.

14. The disc control device of claim 13, wherein
the position decision means decides that the read request should be inserted at the end of the queue, in case the judgement by the direction judgement means is "in the same direction" and the judgment by the time judgement means is below 0;

the read request is classified into either a high priority request, whose allowable time is relatively short and which can be discarded, or other request;

the arrangement judgement control means further includes:
  high priority request judgement means for judging whether the inputted read request is the high priority request;
  discard judgement means for judging that the read request should be discarded if the result of the addition of the data transfer time and the seek time of the all read requests in the queue table is greater than the allowable time of the high priority request, in case the high priority request judgement means judges that the read request is the high priority request and the position decision means decides that the high priority request should be inserted at the end of the queue; and
  discard means for discarding the high priority request about which the judgement by the discard judgement means is "discard", and for prohibiting the operations of the arrangement control means for the high priority request.

15. The disc control device of claim 14, wherein
the allowable time hold means further holds a prohibition flag, for each read request in the queue, which shows that other read requests cannot be inserted just before the read requests in the queue and that the direction of head seek is reversed, when the state of the flag is set; and the arrangement means sets a prohibition flag corresponding to the read request just before the read request inserted at the end of the queue after the arrangement, when the judgement by the direction judgement means is "in the same direction", the judgement by the time judgement means is below 0, and the position decision means decides that the read request should be inserted at the end of the queue.

16. The disc control device of claim 15, wherein
the arrangement control means further includes:
  prohibition flag detection means for detecting the read request whose prohibition flag in the allowable time hold means is set and which is closest to the end of the queue when a new read request is inputted;
  flag direction judgement means for judging whether a cylinder position of the inputted read request and a cylinder position of the detected read request are in the same direction from the cylinder position of the read request at the end of the queue;
  wherein the position decision means decides that the inputted read request should be inserted at the end of the queue, in case judgement by the flag direction judgement means is "not in the same direction"; and
  the search means carries out the search in case the judgement by the flag direction judgement means is "in the same direction".

17. A disc control device for holding a plurality of read requests as a queue, arranging the read requests and a newly inputted read request, reading out the read requests from the queue in the arranged order, and controlling the output of the requested data from a disc, comprising:

queue means for temporarily holding the read requests as the queue in which the read requests can be arranged, the read requests requesting data readout from the disc;

allowable time hold means for holding allowable time, which shows how much more delay can be allowed in order to satisfy delay time until the end of the data output, of each read request in the queue, the delay time being decided based on ranking in the read request in the queue; and arrangement control means for arranging the read requests in the queue along with the newly inputted read request in the queue so that the allowable time of each read request in the queue is not 0, each time a new read request is inputted, including,
  search means for searching for a queue position which can keep the direction of the head seek almost one-way, allowing a small distance of reverse of the head seek, in case the inputted read request is inserted in the queue each time the new read request is inputted;
  time judgement means for judging whether the allowable time of the read requests is below 0 in case the inputted read request is inserted at the found position, the read requests whose ranking being after the ranking of the read request inserted at the found position;
  position decision means for deciding a position, which is found when the time judgement means judges that the allowable time is above 0, as the position at which the read request should be inserted; and
  arrangement means for arranging the read requests in the queue along with the newly inputted read request, so that the newly inputted read request is inserted at the decided position.

18. The disc control device of claim 17, wherein
the read request includes a logical address of the data to be read out and data size;

the queue means includes:
  queue table for holding, for each read request in the queue, the ranking in the queue, data transfer time needed to read and output data right after head seek, a cylinder position on the disc at which corresponding data exist, and seek time needed for the head move between a cylinder position of the data corresponding to the read request and a cylinder position of preceding data, correlating them with each other;
  the arrangement control means further includes:
    cylinder position calculation means for calculating the cylinder position based on the logical address included in the inputted read request;
    data transfer time calculation means for calculating the data transfer time based on the data size included in the inputted read request;
    seek time calculation means for calculating the seek time of the read requests whose ranking in the queue is changed, based on the changed cylinder position of the queue table, and storing the seek time in the queue table, each time the arrangement means arranges the positions of the read requests in the queue;
  the search means includes:
    ranking designation means for designating ranking of the read requests in the queue one by one from the end;
    direction judgement means for judging whether a cylinder position of the read request at the end of the queue and one of cylinder positions which are close to the cylinder position of the read request whose ranking is designated are in the same direction from the cylinder position calculated by the cylinder position calculation means, each time the ranking is designated;

wherein the arrangement means updates the ranking of the queue table in order to insert the read request at the decided position, and stores the cylinder position calculated by the cylinder position calculation means, and the data transfer time calculated by the data transfer time calculation means in the queue table, correlating them with the inputted read request.

19. The disc control device of claim 18, wherein the time judgement means subtracts the data transfer time from the allowable time corresponding to the read request whose ranking is designated by the ranking designation means in order to check whether the result is below 0, when judgement by the direction judgement means is "in the same direction"; and the position decision means decides a position between two adjacent read requests as the position at which the inputted read request should be inserted, in case the judgement by the direction judgement means is "in the same direction" and judgement by the time judgement unit is not below 0 for the former read request, and the judgement by the direction judgement means is "not in the same direction" for the latter read request whose ranking is designated to be next to the ranking of the former read request by the ranking designation means.

20. The disc control device in claim 19, wherein the first calculation means calculates the delay time of the inputted read request by adding the data transfer time and the seek time of all the read requests whose ranking is before the ranking of the inputted read request in the queue, each time the arrangement means arranges the positions of the read requests in the queue; and the allowable time update means updates the allowable time, in the allowable time hold means, of each read request whose ranking in the queue is after the ranking of the inputted read request after the arrangement, each updated value being smaller by the data transfer time of the inputted read request.

21. The disc control device of claim 20, wherein the limited allowable delay time is already set equal for all the read requests.

22. The disc control device of claim 21, wherein the position decision means decides that the read request should be inserted at the end of the queue, when the judgement by the direction judgement means is "in the same direction" and the judgement by the time judgement means is below 0.

23. The disc control device of claim 22, wherein the allowable time hold means further holds a prohibition flag, for each read request in the queue, which shows that other read requests cannot be inserted just before the read requests in the queue and that the direction of head seek is reversed, when the state of the flag is set; and the arrangement means sets a prohibition flag corresponding to the read request just before the read request inserted at the end of the queue after the arrangement, when the judgement by the direction judgement means is "in the same direction", the judgement by the time judgement means is below 0, and the position decision means decides that the read request should be inserted at the end of the queue.

24. The disc control device of claim 23, wherein the arrangement control means further includes:

prohibition flag detection means for detecting the read request whose prohibition flag in the allowable time hold means is set and which is closest to the end of the queue when a new read request is inputted;

flag direction judgement means for judging whether a cylinder position of the inputted read request and a cylinder position of the detected read request are in the same direction from the cylinder position of the read request at the end of the queue;

wherein the position decision means decides that the inputted read request should be inserted at the end of the queue, in case judgement by the flag direction judgement means is "not in the same direction"; and the search means carries out the search in case the judgement by the flag direction judgement means is "in the same direction".

25. The disc control device of claim 20, wherein the limited allowable delay time is included in the inputted read request.

26. The disc control device of claim 25, wherein the position decision means decides that the read request should be inserted at the end of the queue, in case the judgement by the direction judgement means is "in the same direction" and the judgment by the time judgement means is below 0;

the read request is classified into either a high priority request, whose allowable time is relatively short and which can be discarded, or other request;

the arrangement judgement control means further includes:

high priority request judgement means for judging whether the inputted read request is the high priority request;

discard judgement means for judging that the read request should be discarded if the result of the addition of the data transfer time and the seek time of the all read requests in the queue table is greater than the allowable time of the high priority request, in case the high priority request judgement means judges that the read request is the high priority request and the position decision means decides that the high priority request should be inserted at the end of the queue; and discard means for discarding the high priority request about which the judgement by the discard judgement means is "discard", and for prohibiting the operations of the arrangement control means for the high priority request.

27. The disc control device of claim 26, wherein the allowable time hold means further holds a prohibition flag, for each read request in the queue, which shows that other read requests cannot be inserted just before the read requests in the queue and that the direction of head seek is reversed, when the state of the flag is set; and the arrangement means sets a prohibition flag corresponding to the read request just before the read request inserted at the end of the queue after the arrangement, when the judgement by the direction judgement means is "in the same direction", the judgement by the time judgement means is below 0, and the position decision means decides that the read request should be inserted at the end of the queue.

28. The disc control device of claim 27, wherein the arrangement control means further includes:
   prohibition flag detection means for detecting the read request whose prohibition flag in the allowable time hold means is set and which is closest to the end of the queue when a new read request is inputted;
   flag direction judgement means for judging whether a cylinder position of the inputted read request and a cylinder position of the detected read request are in the same direction from the cylinder position of the read request at the end of the queue;
   wherein the position decision means decides that the inputted read request should be inserted at the end of the queue, in case judgement by the flag direction judgement means is "not in the same direction"; and
   the search means carries out the search in case the judgement by the flag direction judgement means is "in the same direction".

29. A disc control device used in a video server, for holding a plurality of read requests as a queue, arranging the read requests and a newly inputted read request in order to satisfy delay time needed for real-time play at a user's end, reading out the requested data from the queue and controlling the output of the requested data from a disc, comprising:
   queue means for temporarily holding the read requests as the queue in which the read requests can be arranged, the read requests requesting data readout from the disc;
   allowable time hold means for holding allowable time of each read request in the queue, the allowable time showing how much more delay could be allowed in order to reach the limited allowable delay time, which is decided based on the ranking of the read request in the queue; and
   arrangement control means for arranging the newly inputted read request along with the read requests in the queue based on the allowable time of each read request in the queue, each time a new read request is inputted, including,
      finding means for finding a queue position which can keep direction of head seek in a one-way direction in case the inputted read request is inserted in the queue, each time a new read request is inputted;
      time judgement means for judging whether the allowable time of the read requests is below 0 in case the inputted read request is inserted at the found position, the read requests whose ranking being after the ranking of the request inserted at the found position;
      position decision means for deciding a position, which is found when the time judgement means judges that the allowable time is not below 0, as the position at which the read request should be inserted; and
      arrangement means for arranging the read requests in the queue along with the newly inputted read request, so that the newly inputted read request is inserted at the decided position.

30. The disc control device of claim 29, further includes:
   allowable time calculation means, each time the arrangement is carried out, for calculating the allowable time of the inputted read request according to the ranking in the queue and storing the allowable time in the allowable time hold means; and
   allowable time update means for updating the allowable time of each read request whose ranking in the queue is after the ranking of the inputted read request after the arrangement, the allowable time being in the allowable time hold means and each updated value being smaller by a delay time created by the change of ranking.

31. The disc control device of claim 30, wherein the allowable time update means further includes:
   first calculation means for calculating a delay time of the inputted read request, each time the positions of the read requests are arranged by the arrangement control means, the delay time being predicted to be needed to output data after the queue's moving up; and
   second calculation means for calculating the allowable time of the inputted read request by subtracting the delay time calculated by the first calculation means from the limited allowable delay time which is between input of the inputted read request in the arrangement control means and output of corresponding data from the disc.

32. The disc control device of claim 31, wherein the limited allowable delay time is included in the inputted read request.

33. The disc control device of claim 29, wherein
   the read request includes a logical address of the data to be read out and data size;
   the queue means includes:
      queue table for holding, for each read request in the queue, the ranking in the queue, data transfer time needed to read out and output data right after head seek, a cylinder position on the disc at which corresponding data exist, and seek time needed for the head move between a cylinder position of the data corresponding to the read request and a cylinder position of preceding data, correlating them with each other;
   the arrangement control means further includes:
      cylinder position calculation means for calculating the cylinder position based on the logical address included in the inputted read request;
      data transfer time calculation means for calculating the data transfer time based on the data size included in the inputted read request;
      seek time calculation means for calculating the seek time of the read requests whose ranking in the queue is changed, based on the cylinder position of the queue table, and storing the seek time in the queue table, each time the arrangement means arranges the positions of the read requests in the queue;
   the search means includes,
      ranking designation means for designating ranking of the read requests in the queue one by one from the end;
      direction judgement means for judging whether a cylinder position of the read request at the end of the queue and a cylinder position of the read request whose ranking is designated are in the same direction from a cylinder position calculated by the cylinder position calculation means, each time the ranking is designated;
      wherein the arrangement means updates the ranking of the queue table in order to insert the read request at the decided position, and stores the cylinder position calculated by the cylinder position calculation means and the data transfer time calculated by the data transfer time calculation means in the queue table, correlating them with the inputted read request.

34. The disc control device of claim 33, wherein the time judgement means subtracts the data transfer time from the allowable time corresponding to the read request whose ranking is designated by the ranking designation means in order to check whether the result is below 0, when judgement by the direction judgement means is "in the same direction"; and the position decision means decides a position between two adjacent read requests as the position at which the inputted read request should be inserted, in case the judgement by the direction judgement means is "in the same direction" and judgement by the time judgement unit is not below 0 for the former read request, and the judgement by the direction judgement means is "not in the same direction" for the latter read request whose ranking is designated to be next to the ranking of the former read request by the ranking designation means.

35. A disc control device used in a video server, for holding a plurality of read requests as a queue, arranging the read requests and a newly inputted read request in order to satisfy delay time needed for real-time play at a user's end, reading out the requested data from the queue and controlling the output of the requested data from a disc, comprising:

queue means for temporarily holding the read requests as the queue in which the read requests can be arranged, the read requests requesting data readout from the disc;

allowable time hold means for holding allowable time of each read request in the queue, the allowable time showing how much more delay could be allowed in order to reach the limited allowable delay time, which is decided based on the ranking of the read request in the queue; and arrangement control means for arranging newly inputted read request along with the read requests in the queue based on the allowable time of each read request in the queue, each time a new read request is inputted, including, search means for searching for a queue position which can keep the direction of the head seek almost one-way, allowing a small distance of reverse of the head seek, in case the inputted read request is inserted in the queue each time the new read request is inputted;

time judgement means for judging whether the allowable time of the read requests is below 0 in case the inputted read request is inserted at the found position, the read requests whose ranking being after the ranking of the read request inserted at the found position;

position decision means for deciding a position, which is found when the time judgement means judges that the allowable time is above 0, as the position at which the read request should be inserted; and arrangement means for arranging the read requests in the queue along with the newly inputted read request, so that the newly inputted read request is inserted at the decided position.

36. The disc control device of claim 35, wherein the read request includes a logical address of the data to be read out and data size;

the queue means includes:

queue table for holding, for each read request in the queue, the ranking in the queue, data transfer time needed to read and output data right after head seek, a cylinder position on the disc at which corresponding data exist, and seek time needed for the head move between a cylinder position of the data corresponding to the read request and a cylinder position of preceding data, correlating them with each other;

the arrangement control means further includes:

cylinder position calculation means for calculating the cylinder position based on the logical address included in the inputted read request;

data transfer time calculation means for calculating the data transfer time based on the data size included in the inputted read request;

seek time calculation means for calculating the seek time of the read requests whose ranking in the queue is changed, based on the changed cylinder position of the queue table, and storing the seek time in the queue table, each time the arrangement means arranges the positions of the read requests in the queue;

the search means includes:

ranking designation means for designating ranking of the read requests in the queue one by one from the end;

direction judgement means for judging whether a cylinder position of the read request at the end of the queue and one of cylinder positions which are close to the cylinder position of the read request whose ranking is designated are in the same direction from the cylinder position calculated by the cylinder position calculation means, each time the ranking is designated;

wherein the arrangement means updates the ranking of the queue table in order to insert the read request at the decided position, and stores the cylinder position calculated by the cylinder position calculation means, and the data transfer time calculated by the data transfer time calculation means in the queue table, correlating them with the inputted read request.

37. The disc control device of claim 36, wherein the time judgement means subtracts the data transfer time from the allowable time corresponding to the read request whose ranking is designated by the ranking designation means in order to check whether the result is below 0, when judgement by the direction judgement means is "in the same direction"; and the position decision means decides a position between two adjacent read requests as the position at which the inputted read request should be inserted, in case the judgement by the direction judgement means is "in the same direction" and judgement by the time judgement unit is not below 0 for the former read request, and the judgement by the direction judgement means is "not in the same direction" for the latter read request whose ranking is designated to be next to the ranking of the former read request by the ranking designation means.

38. A video server disc control device for holding a plurality of read requests, from users for video data, arranging the previously read requests and a newly inputted read request as a queue, reading out the read requests from the queue in the arranged order, and controlling the output of the requested video data from a disc, comprising:

queue means for temporarily holding the read requests as the queue in which the read requests can be arranged, the read requests requesting video data readout from the disc;

allowable time hold means for holding an allowable time that permits normal video data display and which shows how much time delay can be allowed in order to satisfy output of the video data output for each read request in the queue, the delay time being decided based on ranking in the read request in the queue;

arrangement control means for arranging the read requests in the queue along with the newly inputted read request in the queue so that the allowable time of each read request in the queue is not zeros, each time a new read request is inputted, the arrangement control means includes:

finding means for finding a queue position which can keep a direction of head seek in a one-way movement in case the inputted read request is inserted in the queue, each time a new read request is inputted;

time judgment means for judging whether the allowable time delay of the read requests is below 0 in case the inputted read request is inserted at the found position, the read request whose ranking being after the ranking of the read request inserted at the found position;

position decision means for deciding a position, which is found when the time judgement means judges that the allowable time is not below 0, as the position at which the read request should be inserted; and arrangement means for arranging the read requests in the queue along with the newly inputted read request, so that the newly inputted read request is inserted at the decided position;

allowable time calculation means, each time the arrangement is carried out, for calculating the allowable time of the inputted read request according to the ranking in the queue and storing the allowable time in the allowable time hold means; and allowable time update means for updating the allowable time of each read request whose ranking in the queue is after the ranking of the inputted read request after arrangement, the allowable time being in the allowable time hold means and each updated value being smaller by a delay time created by the change of ranking.

39. A video server disc control device for holding a plurality of read requests, from users for video data, arranging the read requests and a newly inputted read request as a queue, reading out the read requests from the queue in the arranged order, and controlling the output of the requested video data from a disc, comprising:

queue means for temporarily holding the read requests as the queue in which the read requests can be arranged, the read requests requesting video data readout from the disc;

allowable time hold means for holding allowable time, which shows how much more delay can be allowed in order to satisfy delay time until the end of the data output and permit normal video data displaying, of each read request in the queue, the delay time being decided based on ranking in the read request in the queue;

arrangement control means for arranging the read requests in the queue along with the newly inputted read request in the queue so that the allowable time of each read request in the queue is not zero, each time a new read request is inputted, the arrangement control means includes:

search means for searching for a queue position which can keep the direction of the head seek almost one-way, allowing a small distance of reverse of the head seek, in case the inputted read request is inserted in the queue each time the new read request is inputted;

time judgment means for judging whether the allowable time of the read requests is below 0 in case the inputted read request is inserted at the found position, the read requests whose ranking being after the ranking of the read request inserted at the found position;

position decision means for deciding a position, which is found when the time judgment means judges that the allowable time is above 0, as the position at which the read request should be inserted; and arrangement means for arranging the read requests in the queue along which the newly inputted read request, so that the newly inputted read request is inserted at the decided position;

allowable time calculation means, each time the arrangement is carried out, for calculating the allowable time of the inputted read request according to the ranking in the queue and storing the allowable time in the allowable time hold means; and allowable time update means for updating the allowable time of reach read request whose ranking in the queue is after the ranking of the inputted read request after the arrangement, the allowable time being in the allowable time hold means and each updated value being smaller by a delay time created by the change of ranking, the allowable time update means includes:

first calculation means for calculating a delay time of the inputted read request, each time the position of the read requests are arranged by the arrangement control means, the delay time being predicted to be needed to output data after the queue's moving up; and second calculation means for calculating the allowable time of the inputted read request by subtracting the delay time calculated by the first calculation means from the limited allowable delay time which is between input of the inputted read request in the arrangement control means and output of corresponding data from the disc.

40. A disc control device used in a video server, for holding a plurality of read requests as a queue, arranging the read requests and a newly inputted read request in order to satisfy a delay time needed for real-time play at a user's end, reading out the requested data from the queue and controlling the output of the requested data from a disc, comprising:

queue means for holding the read requests as a queue in which the read requests can be arranged, the read requests requesting data readout from the disc;

allowable time hold means for holding allowable time of each read request in the queue, the allowable time showing how much time delay would be permissible in order to reach a predetermined limited allowable delay time, which is decided based on the ranking of the read request in the queue;

means for determining if a read request is one of a fast forward read request and a fast reverse read request;

means for discarding one of a fast forward read request and a fast reverse read request when the allowable time cannot be satisfied; and arrangement control means for arranging a newly inputted read request, which has not been discarded, in the read requests in the queue so that the allowable time of each read request in the queue is not zero, each lime a new read request is inputted.

41. A disc control device for holding a plurality of read requests, from users for data, arranging the previously read requests and a newly inputted read request as a queue, reading out the read requests from the queue in the arranged order, and controlling the output of the requested data from a disc, comprising:

queue means for temporarily holding the read requests as the queue in which the read requests can be arranged, the read requests requesting data readout from the disc;

allowable time hold means for holding an allowable time that permits normal data display and which shows how much time delay can be allowed in order to satisfy output of the data output for each read request in the queue, the delay time being decided based on ranking in the read request in the queue;

arrangement control means for arranging the read requests in the queue along with the newly inputted read request in the queue so that the allowable time of each read request in the queue is not zero, each time a new read request is inputted, the arrangement control means includes:

finding means for finding a queue position which can keep a direction of head seek in a one-way movement in case the inputted read request is inserted in the queue, each time a new read request is inputted;

time judgment means for judging whether the allowable time delay of the read requests is below 0 in case the inputted read request is inserted at the found position, the read request whose ranking being after the ranking of the read request inserted at the found position;

position decision means for deciding a position, which is found when the time judgment means judges that the allowable time is not below 0, as the position at which the read request should be inserted; and arrangement means for arranging the read requests in the queue along with the newly inputted read request, so that the newly inputted read request is inserted at the decided position;

allowable time calculation means, each time the arrangement is carried out, for calculating the allowable time of the inputted read request according to the ranking in the queue and storing the allowable time in the allowable time hold means; and allowable time update means for updating the allowable time of each read request whose ranking in the queue is after the ranking of the inputted read request after arrangement, the allowable time being in the allowable time hold means and each updated value being smaller by a delay time created by the change of ranking.

42. A disc control device for holding a plurality of read requests, from users for data, arranging the read requests and a newly inputted read request as a queue, reading out the read requests from the queue in the arranged order, and controlling the output of the requested data from a disc, comprising:

queue means for temporarily holding the read requests as the queue in which the read requests can be arranged, the read requests requesting data readout from the disc;

allowable time hold means for holding allowable time, which shows how much more delay can be allowed in order to satisfy delay time until the end of the data output and permit normal data displaying, of each read request in the queue, the delay time being decided based on ranking in the read request in the queue;

arrangement control means for arranging the read requests in the queue along with the newly inputted read request in the queue so that the allowable time of each read request in the queue is not zero, each time a new read request is inputted, the arrangement control means includes:

search means for searching for a queue position which can keep the direction of the head seek almost one-way, allowing a small distance of reverse of the head seek, in case the inputted read request is inserted in the queue each time the new read request is inputted;

time judgment means for judging whether the allowable time of the read requests is below 0 in case the inputted read request is inserted at the found position, the read requests whose ranking being after the ranking of the read request inserted at the found position;

position decision means for deciding a position, which is found when the time judgment means judges that the allowable time is above 0, as the position at which the read request should be inserted; and arrangement means for arranging the read requests in the queue along which the newly inputted read request, so that the newly inputted read request is inserted at the decided position;

allowable time calculation means, each time the arrangement is carried out, for calculating the allowable time of the inputted read request according to the ranking in the queue and storing the allowable time in the allowable time hold means; and allowable time update means for updating the allowable time of reach read request whose ranking in the queue is after the ranking of the inputted read request after the arrangement, the allowable time being in the allowable time hold means and each updated value being smaller by a delay time created by the change of ranking, the allowable time update means includes:

first calculation means for calculating a delay time of the inputted read request, each time the position of the read requests are arranged by the arrangement control means, the delay time being predicted to be needed to output data after the queue's moving up; and second calculation means for calculating the allowable time of the inputted read request by subtracting the delay time calculated by the first calculation means from the limited allowable delay time which is between input of the inputted read request in the arrangement control means and output of corresponding data from the disc.

\* \* \* \* \*